June 2, 1964
M. J. GEERTS ETAL
3,135,582
PRODUCTION AND SEPARATION OF CYANOGEN
Filed Feb. 16, 1961
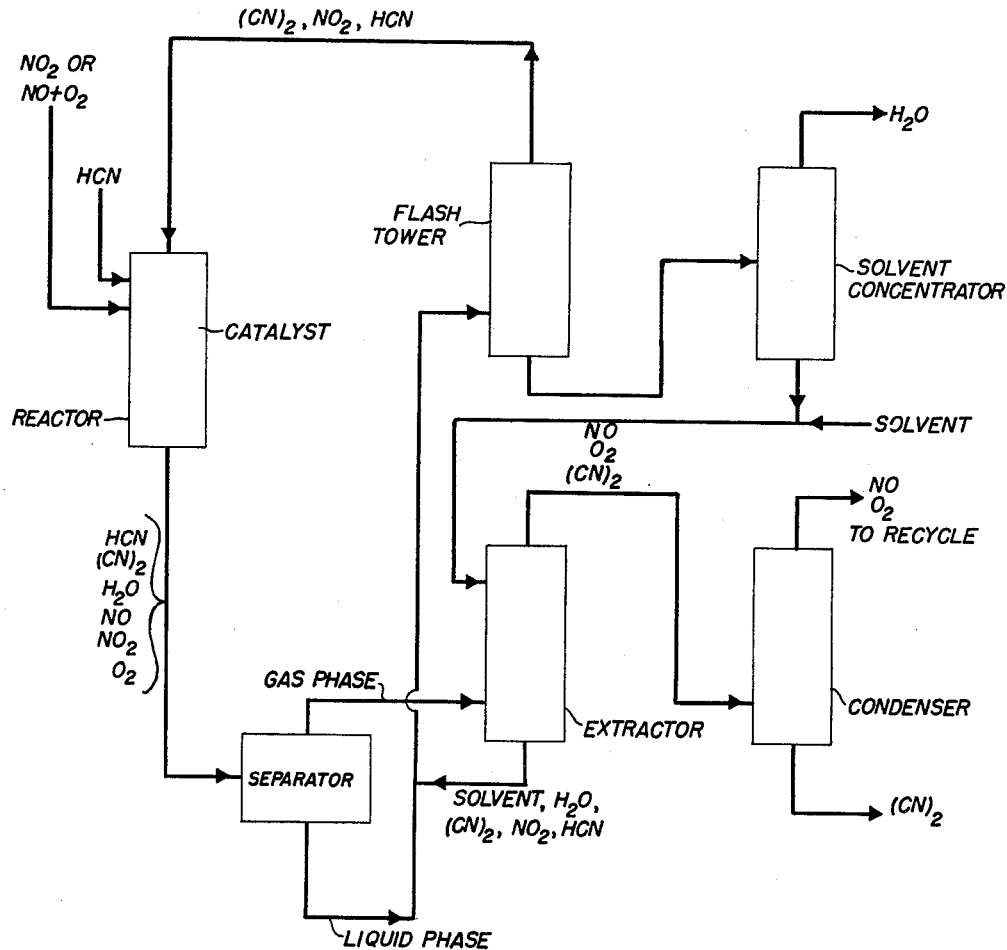
PRODUCTION AND RECOVERY OF CYANOGEN
*INVENTORS*
MARCELLUS J. GEERTS
WILLIAM L. FIERCE
BY WALTER J. SANDNER
ATTORNEY United States Patent Office 3,135,582
Patented June 2, 1964

3,135,582
PRODUCTION AND SEPARATION OF CYANOGEN
Marcellus J. Geerts, Evanston, Walter J. Sandner, Carpentersville, and William L. Fierce, Crystal Lake, Ill., assignors to The Pure Oil Company, Chicago, Ill., a corporation of Ohio
Filed Feb. 16, 1961, Ser. No. 89,698
17 Claims. (Cl. 23—151)

This invention relates to a new and improved process for the production and recovery of cyanogen in relatively high purity. In particular, this invention is concerned with a process for preparing cyanogen by a catalyzed oxidation of hydrogen cyanide using a mixture of oxygen and a nitrogen oxide, having an oxidation state higher than nitrous oxide, followed by separation of cyanogen and recycle of unreacted materials.

In Fierce and Sandner, Patent 2,884,308, there is described a process for the preparation of cyanogen by partial oxidation of hydrogen cyanide, utilizing a higher nitrogen oxide or a combination of nitric oxide (or a higher nitrogen oxide) and oxygen at elevated temperatures, with or without a catalyst. In the Fierce et al. patent, several catalysts, e.g., magnesium chloride, calcium chloride, and calcium oxide, supported on pumice, are disclosed as effective catalysts for the oxidation of hydrogen cyanide to cyanogen. In that process it is also suggested that the cyanogen may be recovered by condensation, and that unreacted materials may be separated and recycled. In the Fierce et al. process, hydrogen cyanide is oxidized by nitrogen dioxide at a temperature of about 100°–1,000° C., to form cyanogen. The nitrogen dioxide is charged, as such, to the reactor, or it is formed by in-situ reaction of nitric oxide and oxygen. Suitable catalysts and appropriate reaction conditions are described. In this process, the reaction effluent consists essentially of cyanogen, water, nitrogen dioxide, nitric oxide, oxygen (when used in excess), and unconverted hydrogen cyanide. Because some of these constituents have similar volatilities, it is difficult to separate pure cyanogen by simple condensation or distillation. When attempts were made to recover substantially pure cyanogen by means of low-temperature distillation, it was found that some nitrogen dioxide remained with the cyanogen. Consequently, a second purification step was required to free the cyanogen of the contaminating nitrogen dioxide.

It is therefore one object of this invention to provide a new and improved process for the production and recovery of cyanogen.

Another object of this invention is the provision of an improved process in which hydrogen cyanide is oxidized with a nitrogen oxide, cyanogen is recovered from the reaction effluent, and unreacted materials are recycled.

Another object of this invention is to provide a process in which hydrogen cyanide is oxidized with a nitrogen oxide to produce a cyanogen-containing reaction effluent, cyanogen and by-product water are removed from the effluent, and unreacted materials are recycled.

A feature of this invention is the provision of a process in which hydrogen cyanide is oxidized by a nitrogen oxide in the presence of a catalyst to produce a reaction effluent containing cyanogen, and the reaction effluent is contacted with an extracting solvent to remove unreacted hydrogen cyanide and nitrogen oxide for recycle.

Another feature of this invention is the provision of a process for recovery of cyanogen from a reaction effluent containing hydrogen cyanide, cyanogen, water, nitric oxide, nitrogen dioxide, and oxygen, in which the mixture is contacted with an extracting solvent in which nitrogen dioxide or hydrogen cyanide are soluble, and nitric oxide, oxygen and cyanogen are substantially insoluble, separating a gaseous effluent from the extraction step, condensing and recovering cyanogen from the gaseous effluent, and flash-distilling hydrogen cyanide and nitrogen dioxide from the hydrogen cyanide to cyanogen and recovery of cyanogen in substantially pure form. In our process a mixture of hydrogen cyanide and nitrogen dioxide, or a mixture of nitric oxide (or higher nitrogen oxides) and oxygen, is introduced into a reactor and contacted with a catalyst at a temperature sufficient to oxidize the hydrogen cyanide to cyanogen. The reaction is carried out at atmospheric pressure, although sub-atmospheric or super-atmospheric pressures may be employed. The reactor is at a suitable temperature in the range of about 100°–1000° C., sufficient to effect reaction, and preferably a temperature in the range of about 200°–450° C. The rate of flow of reactants is not critical and may vary widely. The reactants may be fed at a gaseous hourly space velocity in the range from 50 to 2000 or higher. The catalyst used in the reactor may be any of the catalysts described in the Fierce et al. patent, or any other catalysts known to the prior art to be useful in catalyzing the oxidation of hydrogen cyanide by nitrogen oxides. In the reactor, a major portion of the hydrogen cyanide is converted to cyanogen, and a reaction effluent is withdrawn from the reactor which consists of a mixture of unreacted hydrogen cyanide, cyanogen, water, nitric oxide, nitrogen dioxide, and oxygen. The reaction effluent is withdrawn into a separator in which it is cooled and partially condensed. In the separator, the reaction effluent is therefore separated into a liquid phase consisting primarily of water containing dissolved hydrogen cyanide, cyanogen, and small amounts of nitrogen oxides. The gaseous effluent which consists of hydrogen cyanide, cyanogen, small amounts of water, nitrogen oxides, and oxygen is withdrawn to an extractor column where it is countercurrently contacted with an extracting solvent. The extracting solvent used is a solvent in which hydrogen cyanide and nitrogen dioxide are soluble but in which cyanogen, nitric oxide, and oxygen are substantially insoluble. The solvent used is preferably a high-boiling solvent (having a boiling point of at least 50° above the boiling point of hydrogen cyanide, and preferably boiling above 100° C.), and is preferably a material which forms a relatively stable complex with nitrogen dioxide. The extraction step can be carried out at ambient temperatures although it is preferred that the solvent be cooled to a temperature in the range of about 0°–30° C. In the extractor, substantially all of the hydrogen cyanide and nitrogen dioxide, together with a very small amount of cyanogen, are absorbed in the extracting solvent and a gaseous effluent is discharged from the extractor which consists essentially of a mixture of nitric oxide, oxygen, and cyanogen. The gaseous effluent from the extractor is circulated to a condenser in which the effluent is cooled and/or compressed to cause all of the cyanogen to condense. The cyanogen which is recovered in the condenser is substantially pure and suitable for chemical use. The gaseous effluent from the condenser consists of a mixture of nitric oxide and oxygen and is preferably recycled to the reactor.

From the extractor a rich solvent is withdrawn which contains a small amount of water and cyanogen together with substantially all of the nitrogen dioxide and the hydrogen cyanide in the gaseous effluent from the reactor. The rich solvent withdrawn from the extractor is mixed with the liquid phase from the separator and the combined stream is passed through a flash-distillation tower. In the flash-distillation tower the liquid is heated to a temperature sufficient to flash-distill the dissolved hydrogen cyanide, nitrogen dioxide, and cyanogen, which gases are recycled to the reactor together with fresh feed (hydrogen cyanide and make-up nitrogen oxides and oxygen). The solvent is removed from the flash tower to a solvent concentrator, e.g., evaporator, distillation column, etc., where the water of reaction is removed and the solvent is concentrated to a composition suitable for recycle to the extractor. In this process it is seen that hydrogen cyanide and a mixture of a nitrogen oxide and oxygen are introduced into the reactor and the hydrogen cyanide converted into cyanogen. In the separatory portions of the process the by-product water and unreacted hydrogen cyanide and nitrogen dioxide are separated from the cyanogen so that the cyanogen can be condensed from the gaseous effluent in substantially pure form. By utilizing a solvent in which hydrogen cyanide and nitrogen dioxide are soluble (preferably a solvent which complexes with nitrogen dioxide) and in which cyanogen is insoluble, it is possible to effect a high degree of separation of cyanogen from unreacted materials and by-product water. This makes possible the recovery of cyanogen in a very pure form, and at a high rate, with a minimum contamination of product and a minimum recycle of cyanogen in the process. The use of a solvent which complexes with nitrogen dioxide and which is relatively high boiling (boiling point at least 50° C. higher than the boiling point of hydrogen cyanide) permits the flash-distillation of nitrogen dioxide and hydrogen cyanide from the solvent for recycle so that the solvent and water of reaction may be withdrawn to a separate unit for separation of water and recycle of solvent.

In carrying out this process, the solvent used is a solvent having a boiling point substantially greater than the boiling point of hydrogen cyanide, and preferably greater than the boiling point of water. The solvent is selected to have a high solvency for both nitrogen dioxide and hydrogen cyanide and is preferably a solvent which complexes with nitrogen dioxide. If the solvent has a boiling point greater than 100° C., the separation of water in the solvent concentrator is greatly facilitated. Solvents which can be used in this process include ethers, such as diethyl ether, dioxane, and tetrahydrofuran; nitriles, such as acetonitrile, benzonitrile, phenylacetonitrile, and p-tolunitrile; tertiary amines, such as pyridine, quinoline, triethylamine, dimethylaniline, and N-methyldiphenylamine; ketones, such as acetone, benzophenone, etc.; ethyl acetate, acetic acid, nitrobenzene, benzaldehyde, diethylnitrosoamine, and dimethylsulfoxide, both in anhydrous form and in admixture with not more than 50% vol. of water. Preferably, the water content of the solvent is maintained within a range of about 0–2% vol. in order to simplify the separation of nitrogen dioxide from the solution.

The following non-limiting examples are illustrative of the scope of this invention.

*Example I*

In one experiment a 20-inch long and 1-inch O.D. Pyrex glass-tube reactor was charged with 70 ml. of 4.8% MgO on pumice as catalyst. The outlet end of the tube was connected to a heated knock-out (liquid de-entraining) trap, and to a series of gas-scrubbing bottles. Five gas-scrubbing bottles were provided, each containing about 30 ml. of glacial acetic acid at about 25° C., and one gas-scrubbing bottle at the end of the train containing about 25 ml. of 10% aqueous silver nitrate solution. At the outlet of the train of scrubbing bottles there was provided a trap immersed in an alcohol-Dry-Ice bath. Hydrogen cyanide, nitric oxide and oxygen were introduced to the reactor in a mol ratio of 2.1/1.0/2.0 and a total charge gaseous hourly space velocity of 166. The reactor was maintained at a temperature of 115°–130° C., by an electric furnace. The reactants were conducted through the reactor tube in which the nitrogen dioxide oxidized the hydrogen cyanide to cyanogen and water, and the reaction effluent was withdrawn through the train of gas-scrubbing bottles and Dry-Ice trap to test the efficiency of this process in separating unreacted nitrogen dioxide and hydrogen cyanide and in permitting recovery of cyanogen in high purity. In this run, 41% of the hydrogen cyanide was converted and cyanogen was obtained in a yield of 41% and selectivity of 100%. In a 290-minute run in which the hydrogen cyanide was oxidized with nitrogen dioxide, 68.6% of the total cyanogen produced in the run was recovered in the cold trap. After simple drying, it analyzed 99.9% cyanogen. Furthermore, the precipitate in the silver nitrate trap was equivalent to only about 2% of the unreacted hydrogen cyanide. The train of gas-scrubbing bottles containing glacial acetic acid was effective in extracting substantially all of the nitrogen dioxide and hydrogen cyanide from the reactor effluent, and permitted recovery of substantially pure cyanogen in the cold trap.

*Example II*

In another experiment, the Pyrex glass tube of Example I was used as a reactor and charged wtih 70 ml. of magnesium oxide (4.8%) on pumice as catalyst. The outlet rich solvent for recycle.

Other objects and features of this invention will become apparent from time to time throughout the specification and claims as hereinafter related.

The process of this invention comprises the steps of: (1) contacting hydrogen cyanide with nitrogen dioxide (or mixtures of nitric oxide or higher nitrogen oxide and oxygen) over a suitable catalyst (as described in the aforementioned Fierce et al. patent) at appropriate reaction conditions (e.g., 100°–1000° C., a gaseous hourly space velocity of 50–2000 or higher); (2) partially condensing the reactor effluent and separating the resulting liquid and gas phases; (3) contacting the separated gas phase with an extracting solvent (a solvent in which nitrogen dioxide and hydrogen cyanide are soluble, but in which nitric oxide, oxygen and cyanogen are substantially insoluble) in a countercurrent extraction zone; (4) combining the enriched solvent from the extraction zone with the liquid phase separated from the reactor effluent; (5) flash-distilling the nitrogen dioxide, hydrogen cyanide, and dissolved cyanogen from the enriched solvent and recycling them to the reactor; (6) withdrawing the resulting mixture of solvent and water from the flash-distillation zone, separating at least a portion of the water, and recycling the reconcentrated solvent to the extraction zone; and (7) withdrawing the gaseous effluent from the extraction zone, compressing and/or cooling it sufficiently to condense its cyanogen content, as substantially pure cyanogen, and recycling the remaining nitrogen oxide and oxygen to the reactor.

In the accompanying drawing there is shown a flow diagram of our improved process for the partial oxidation of the reactor was connected to a heated knock-out (liquid de-entraining) trap which was connected to a 12-inch long, 12 mm.-O.D. glass tube, packed with ¼-inch Pyrex glass helices. The outlet from the packed tube was connected to a gas-scrubbing bottle containing about 25 ml. of 15% aqueous silver nitrate solution and a Dry-Ice-alcohol cold trap. Then a 240-minute run was made in which hydrogen cyanide, nitric oxide and oxygen were fed in a mol ratio of 2.1/1.0/2.0 at a total charge gaseous hourly space velocity of 168. The reactor was maintained at a temperature of 140°–155° C., during the run. During this run, 45.8% of the hydrogen cyanide was converted and cyanogen was obtained with a selectivity of 94.3%.

The reaction effluent was passed through the product-separation train while glacial acetic acid was charged to the packed tube (extraction tower) at a rate of 0.63 ml./min. At the end of the run, the cold trap contained 3.50 g. of product, analyzing 97.7% cyanogen and 2.3% water. After simple drying, cyanogen was obtained in substantially 100% purity. No hydrogen cyanide or nitrogen dioxide was present in the product. The precipitate in the silver nitrate trap was equivalent to only 1.5% of the unreacted hydrogen cyanide. Substantially all of the hydrogen cyanide was retained in the knock-out trap or in the extractor. In this run the glacial acetic acid was completely effective in removing the hydrogen cyanide and nitrogen dioxide from the product stream and permitting recovery of substantially pure cyanogen.

*Example III*

A reactor, as used in Examples I and II, is charged with a catalyst consisting of magnesium oxide on alumina gel which has been calcined to effect a chemical bond between the magnesium oxide and the alumina support in the form of an oxide linkage to the support. The reactor is electrically heated to a temperature of about 200° C. At the inlet end of the reactor there is introduced a feed consisting of a mixture of nitrogen dioxide, oxygen, and hydrogen cyanide in a mol ratio of 1.0/5.0/2.5, at a total charge gaseous hourly space velocity of 444. In the reactor, the reactants are heated in contact with the catalyst and the hydrogen cyanide is converted to cyanogen and water in a yield of 101.8% and selectivity of 86.2%. Under these reaction conditions, the effluent which is discharged from the reactor consists of about 2 mol percent hydrogen cyanide, 14 mol percent cyanogen, 16 mol percent water, 6 mol percent nitric oxide, 6 mol percent nitrogen dioxide, and 48 mol percent oxygen. The reaction effluent is conducted to a gas-liquid separator where the effluent is cooled and partially condensed into a liquid phase, consisting essentially of water containing small amounts of hydrogen cyanide, cyanogen and nitrogen dioxide, and a gas phase is removed which consists of a mixture of hydrogen cyanide, cyanogen, nitric oxide, nitrogen dioxide, oxygen, and a small amount of water. The gas phase is contacted by a countercurrent stream of glacial acetic acid at a temperature of 25° C. In the extraction column, the water, nitrogen dioxide and hydrogen cyanide, along with a minor amount of the cyanogen, is absorbed in the glacial acetic acid. Overhead from the extraction column there is withdrawn a gaseous effluent which consists essentially of cyanogen and oxygen, together with a minor amount of nitric oxide. This gaseous effluent is conducted to a condenser which is maintained at a temperature of about −73° C. to condense the cyanogen. The cyanogen condensate which is recovered from the condenser is substantially pure and after drying has a purity in excess of 99%. The gaseous effluent from the condenser, consisting of nitric oxide and oxygen, is recycled to the reactor in admixture with fresh charge. From the extraction column the solvent (acetic acid) is withdrawn and contains in solution substantially all of the hydrogen cyanide and nitrogen dioxide in the reaction effluent, together with minor amounts of cyanogen, and is mixed with the liquid phase from the separator and passed to the flash tower. In the flash tower the solution is heated to a temperature of 40°–100° C., and cyanogen, nitrogen dioxide, and hydrogen cyanide are flashed off and recycled to the reactor in admixture with fresh feed. The solvent which is withdrawn from the flash tower consists of acetic acid which is substantially diluted with water absorbed from the reaction effluent. The dilute solvent is passed to a solvent concentrator (evaporator) where water is separated by evaporation and the concentrated acid is recycled, together with make-up solvent, if necessary, to the extraction column. In this process, the recycle of solvent and of nitrogen dioxide and nitric oxide is complete, and only minor amounts of these materials need be added to the process to make up for minor losses in handling. The introduction of fresh reactants into the process, once it is in operation, consists merely of introducing hydrogen cyanide and oxygen at the reactor. The net material balance across the system involves simply the reaction of hydrogen cyanide and oxygen to yield cyanogen and water, since the nitrogen dioxide is recycled within the system and is not consumed.

In carrying out this process, the reactor may be charged with any suitable catalyst and may be operated at any temperature in the range of about 100°–1000° C. sufficient to oxidize the hydrogen cyanide to cyanogen. Suitable catalysts and reaction conditions are described in Fierce et al. patent, 2,884,308, or in the copending patent applications of H. O. Folkins and M. J. Geerts, Serial No. 76,495, filed December 19, 1960, and now abandoned, entitled Process and Catalyst Therefor, and M. J. Geerts, H. O. Folkins and C. T. O'Malley, Serial No. 79,536, filed December 30, 1960, now Patent No. 3,065,056, entitled Process. Variations in the catalyst or reaction conditions has no significant effect on the operability of this process but merely changes the rate and amount of conversion of hydrogen cyanide to cyanogen and thus would vary the composition of the reaction effluent. We have found that this process is effective in separating hydrogen cyanide and nitrogen dioxide from the cyanogen-containing reaction effluent regardless of its composition, and the process thereof is not dependent in any way on the use of specific catalysts or specific reaction conditions in the reactor. In the separator, which is connected at the outlet from the reactor, the amount of cooling is not critical and the separator may be operated at temperatures in the range from 0° to 100° C., although it is preferably maintained at a temperature of 10–50° C., so that the gas phase which is conducted to the extractor is not at a temperature substantially higher than that of the extracting solvent. In the extractor, the solvent used can be any of the solvents previously described and is preferably a high-boiling solvent which forms a molecular complex with nitrogen dioxide. The physical requirements of the solvent are that it should have a boiling point of at least 50° C. above the boiling point of hydrogen cyanide and preferably in excess of 100° C. The solvent must be one in which hydrogen cyanide and nitrogen dioxide are soluble and in which cyanogen is relatively insoluble. While cyanogen is appreciably soluble in glacial acetic acid, the solubility is minor compared to the solubility of hydrogen cyanide and nitrogen dioxide in that solvent. The solvent quickly becomes saturated with respect to cyanogen and the cyanogen content of the rich extraction solvent is recycled to the reactor. The process is more efficient when a solvent is used in which cyanogen is almost completely insoluble, but which has a high solvency for hydrogen cyanide and nitrogen dioxide. While all of the solvents previously mentioned can be used in this process we have found that acetonitrile is especially useful since hydrogen cyanide and nitrogen dioxide are soluble therein and cyanogen is almost totally insoluble. When a solvent such as acetonitrile is used, which has a boiling point less than that of water, the solvent concentrator which is connected in series with a flash tower is a fractional distillation column which separates water from the solvent so that the solvent may be recycled to the extractor. The temperature of operation of the extraction column is not critical and may vary over a wide range, although the solvent should be maintained at a low enough temperature that a substantial amount of the hydrogen cyanide and nitrogen dioxide are recovered. Preferably, the extractor is operated at a temperature in the range of about 0°–30° C. The flash tower is operated at a temperature of about 65° C., or higher, depending upon the boiling point of the extracting solvent which is used.

While we have described this invention fully and completely with special emphasis on several preferred embodiments thereof, we wish it to be understood that within the scope of the intended claims this invention may be practiced otherwise than as specifically described herein.

The embodiments of the invention in which an exclusive property or privilege is claimed are defined as follows:

1. A process for the production and recovery of cyanogen which comprises reacting a mixture of oxygen and a nitrogen oxide, selected from the group consisting of nitric oxide and higher nitrogen oxides, with hydrogen cyanide in a reactor in the presence of a catalyst, at a temperature of 100°–1000° C., sufficient to oxidize the hydrogen cyanide to cyanogen, thereby producing a reaction effluent containing cyanogen, nitrogen oxides, hydrogen cyanide and water, contacting the reaction effluent from the reactor with a extracting solvent which has a boiling point above the boiling point of hydrogen cyanide, which is not destructively reactive with said reaction effluent and in which nitrogen dioxide and hydrogen cyanide are soluble and nitric oxide, oxygen, and cyanogen are substantially insoluble, separating a gaseous effluent from the extraction step, and condensing and recovering cyanogen from said gaseous effluent.

2. A method in accordance with claim 1 in which the absorbed gases, consisting essentially of nitrogen dioxide, hydrogen cyanide, and minor amounts of cyanogen, are flash-distilled from the extracting solvent and recycled together with fresh feed to said reactor.

3. A method in accordance with claim 2 in which water is removed from the extracting solvent by evaporation following said flash-distillation step and the dehydrated solvent is recycled to the extractor.

4. A method in accordance with claim 2 in which the effluent from said reactor is partially condensed and separated into a gas phase and a liquid phase, said gas phase is contacted with the extracting solvent, and said liquid phase is mixed with rich solvent from the extraction step and circulated to the flash-distillation.

5. A method in accordance with claim 2 in which the gaseous effluent from the cyanogen condensation step is recycled to the reactor.

6. A method in accordance with claim 1 in which the extracting solvent is a solvent having a boiling point above about 65° C.

7. A method in accordance with claim 1 in which the extracting solvent is one which forms a complex with nitrogen dioxide.

8. A method in accordance with claim 1 in which the extracting solvent is selected from the group consisting of ethers, nitriles, tertiary amines, ketones, ethyl acetate, acetic acid, nitrobenzene, benzaldehyde, diethylnitrosoamine, and dimethylsulfoxide.

9. A cyclic process for the production and recovery of cyanogen which comprises reacting a mixture of oxygen and a nitrogen oxide, selected from the group consisting of nitric oxide and higher nitrogen oxides, with hydrogen cyanide in a reactor in the presence of a catalyst at a temperature of 100°–1000° C., sufficient to oxidize the hydrogen cyanide to cyanogen, thereby producing a reaction effluent containing cyanogen, nitrogen oxides, hydrogen cyanide and water, cooling the reaction effluent from the reactor in a separator to partially condense the effluent and form a gas phase and a liquid phase, contacting the gas phase from the separator in an extractor with a solvent which has a boiling point above the boiling point of hydrogen cyanide, which is not destructively reactive with said reaction effluent and in which hydrogen cyanide and nitrogen dioxide are soluble and cyanogen, oxygen, and nitric oxide are substantially insoluble, separating the gaseous effluent from the extractor and condensing and recovering cyanogen therefrom, recycling the cyanogen-free gaseous effluent, consisting essentially of oxygen and nitric oxide, to the reactor, mixing the liquid phase from the separator with rich solvent from the extractor, flash-distilling absorbed hydrogen cyanide and nitrogen dioxide from the rich solvent and recycling the same to the reactor, and evaporating water from the lean solvent and recycling the solvent to the extractor.

10. A method in accordance with claim 9 in which the extracting solvent is a solvent having a boiling point above about 65° C.

11. A method in accordance with claim 9 in which the extracting solvent is one which forms a complex with nitrogen dioxide.

12. A method in accordance with claim 9 in which the extracting solvent is selected from the group consisting of ethers, nitriles, tertiary amines, ketones, ethyl acetate, acetic acid, nitrobenzene, benzaldehyde, diethylnitrosoamine, and dimethylsulfoxide.

13. A method in accordance with claim 9 in which the extracting solvent is acetic acid.

14. A method in accordance with claim 9 in which the extracting solvent is acetonitrile.

15. A method in accordance with claim 9 in which the extracting solvent is dioxane.

16. A method in accordance with claim 9 in which the extracting solvent is benzophenone.

17. A method in accordance with claim 9 in which the extracting solvent is phenylacetonitrile.

References Cited in the file of this patent

UNITED STATES PATENTS 2,884,308    Fierce et al. _____ Apr. 28, 1959

OTHER REFERENCES

Hammond: "Separation and Purification of Materials," the Philosophical Library, New York, 1958, page 228.

UNITED STATES PATENT OFFICE
CERTIFICATE OF CORRECTION

Patent No. 3,135,582                                            June 2, 1964

Marcellus J. Geerts et al.

It is hereby certified that error appears in the above numbered patent requiring correction and that the said Letters Patent should read as corrected below.

Column 2, line 4, after "the" insert the following:

rich solvent for recycle.

Other objects and features of this invention will become apparent from time to time throughout the specification and claims as hereinafter related.

The process of this invention comprises the steps of: (1) contacting hydrogen cyanide with nitrogen dioxide (or mixtures of nitric oxide or higher nitrogen oxide and oxygen) over a suitable catalyst (as described in the aforementioned Fierce et al patent) at appropriate reaction conditions (e.g., 100°-1000° C., gaseous hourly space velocity of 50-2000 or higher); (2) partially condensing the reactor effluent and separating the resulting liquid and gas phases; (3) contacting the separated gas phase with an extracting solvent (a solvent in which nitrogen dioxide and hydrogen cyanide are soluble, but in which nitric oxide, oxygen and cyanogen are substantially insoluble) in a countercurrent extraction zone; (4) combining the enriched solvent from the extraction zone with the liquid phase separated from the reactor effluent; (5) flash-distilling the nitrogen dioxide, hydrogen cyanide, and dissolved cyanogen from the enriched solvent and recycling them to the reactor; (6) withdrawing the resulting mixture of solvent and water from the flash-distillation zone, separating at least a portion of the water, and recycling the reconcentrated solvent to the extraction zone; and (7) withdrawing the gaseous effluent from the extraction zone, compressing and/or cooling it sufficiently to condense its cyanogen content, as substantially pure cyanogen, and recycling the remaining nitrogen oxide and oxygen to the reactor.

In the accompanying drawing there is shown a flow diagram of our improved process for the partial oxidation of column 4, line 21, for "wtih" read -- with --; line 23, beginning with "rich" strike out all to and including "of" in line 55; same column 4, line 55, before "the" insert -- of --; column 6, line 24, for "thereof" read -- therefore --; column 7, line 13, for "a", first occurrence, read -- an --.

Signed and sealed this 27th day of October 1964.

(SEAL)
Attest:

ERNEST W. SWIDER
Attesting Officer

EDWARD J. BRENNER
Commissioner of Patents